JOHN H. FLEMING.
Improvement in Thill-Couplings.
No. 115,184.    Patented May 23, 1871.
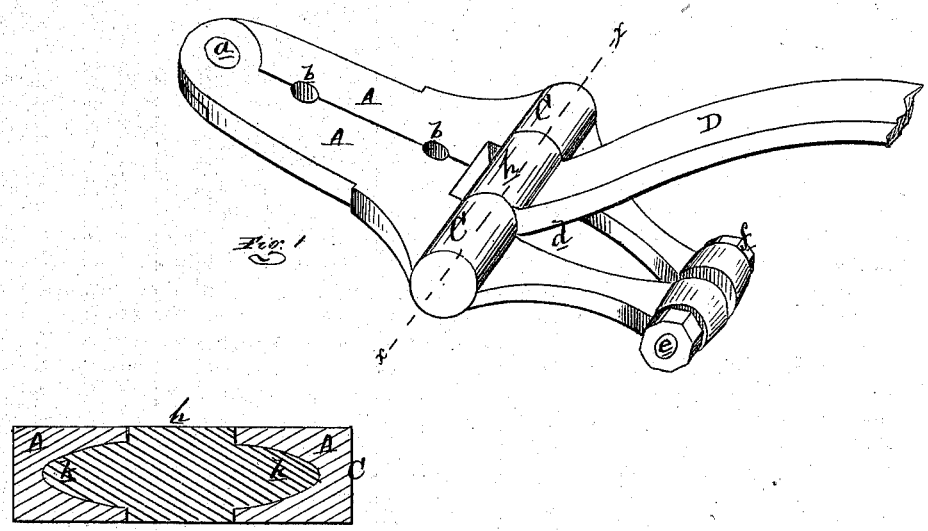
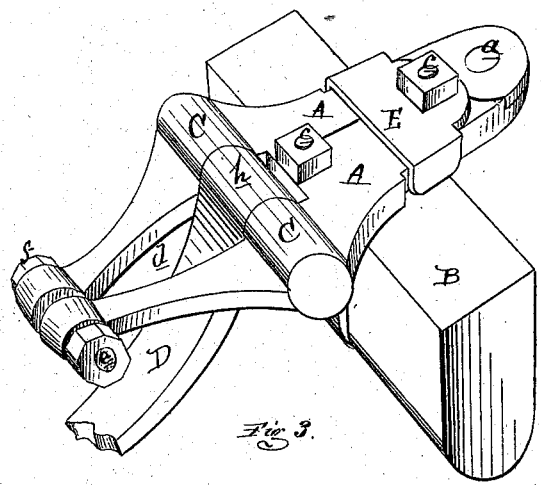

115,184

UNITED STATES PATENT OFFICE.

JOHN H. FLEMING, OF DUNDEE, MICHIGAN.

IMPROVEMENT IN THILL-COUPLINGS.

Specification forming part of Letters Patent No. 115,184, dated May 23, 1871.

*To whom it may concern:*

Be it known that I, JOHN H. FLEMING, of Dundee, in the county of Monroe and State of Michigan, have invented a new and useful Improvement in Device for Attaching Shafts to Wagons; and I do declare that the following is a true and accurate description thereof, reference being had to the accompanying drawing and to the letters of reference marked thereon and being a part of this specification, in which—

Figure 1 is a perspective, looking at the top of my device. Fig. 2 is a transverse vertical section of the same on the line $x\ x$ in Fig. 1. Fig. 3 is a perspective, looking at the bottom of my device as attached to a section of an axle.

Like letters refer to like parts in each figure.

The nature of this invention relates to an improved and simplified construction of a device for attaching shafts or draft-poles to the axles of wagons or carriages, so that the same will be noiseless in its operation and inexpensive to construct, avoiding the employment of rubber, leather, or other washers. The invention consists in the construction of a device for the purpose in a peculiar manner, and in combination therewith of a novel method of preventing any accident which might arise from an accidental loss of a nut and bolt, as more fully hereinafter described.

In the accompanying drawing, A represents two jaws, of the general form shown, hinged together at their rear ends, as at $a$. Through the holes $b$ in the jaws the clip-bolts $c$ pass, by means of which the device is secured to the axle B. C is an enlargement of the jaws, which are bifurcated from a point just in rear of the said enlargement. Within this enlargement, and on each side of the opening $d$, between the jaws, there are chambers, conical in shape, as shown in Fig. 2. The forward part of the jaws are curved, as shown, inwardly, so that the parts will nearly meet, and they are secured together by the bolt $e$ and nut $f$. The shaft or pole-iron D is provided with an enlargement, $h$, the ends of which terminate in conical-shaped ears or lugs $k$, which are designed to fit into and fill the chambers in the enlargement of the jaws heretofore described.

Removing the nut $f$ allows the jaws to be opened, when the shaft-iron may be inserted and the nuts replaced. As the lugs or ears $k$ wear in the chambers, tightening the nut $f$ on the bolt $e$ keeps the parts together and prevents any rattling or noise in their operation. Should, by any accident, the nut $f$ be lost, so that there would be danger of the shaft or pole becoming disengaged, the employment of the clamp E upon the under side of the device, and in rear of the axle, would entirely obviate the difficulty.

Preferably, this device should be made of cast malleable iron, and the lugs or ears $k$ and the interior of the chambers should be chilled.

What I claim as my invention, and desire to secure by Letters Patent, is—

1. A device for securing shafts or poles to wagons, wherein the jaws A and shaft or pole iron D are constructed and arranged to operate substantially as set forth.

2. In combination therewith, the clamp E, for the purposes set forth.

JOHN H. FLEMING.

Witnesses:
 THOS. S. SPRAGUE,
 H. F. EBERTS.